March 14, 1961 R. S. HOOD 2,974,830

MIXING DEVICE

Filed Dec. 17, 1958 6 Sheets-Sheet 1

INVENTOR.
Ralph Stedman Hood
BY
Porter, Chittick & Russell
Attys.

INVENTOR.
Ralph Stedman Hood
BY
Porter, Chittick & Russell
Attys.

March 14, 1961 R. S. HOOD 2,974,830

MIXING DEVICE

Filed Dec. 17, 1958 6 Sheets-Sheet 3

INVENTOR.
Ralph Stedman Hood
BY
Porter, Chittick & Russell
Attys.

March 14, 1961 R. S. HOOD 2,974,830

MIXING DEVICE

Filed Dec. 17, 1958 6 Sheets-Sheet 4

INVENTOR.
Ralph Stedman Hood
BY
Porter, Chittick & Russell
Attys

INVENTOR.

Ralph Stedman Hood

BY

Porter, Chittick & Russell

Attys.

March 14, 1961 R. S. HOOD 2,974,830
MIXING DEVICE
Filed Dec. 17, 1958 6 Sheets-Sheet 6
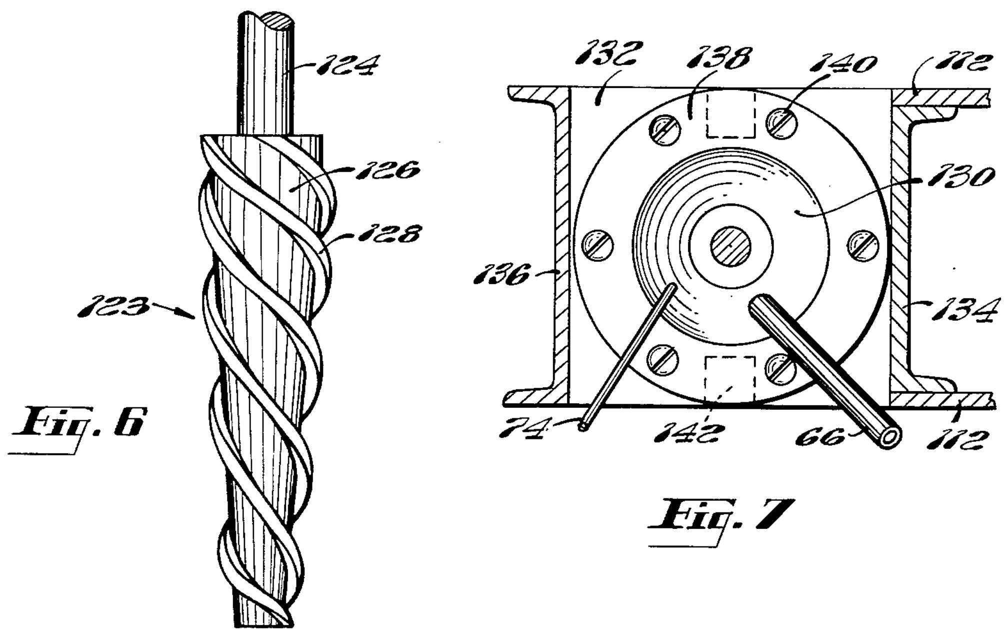
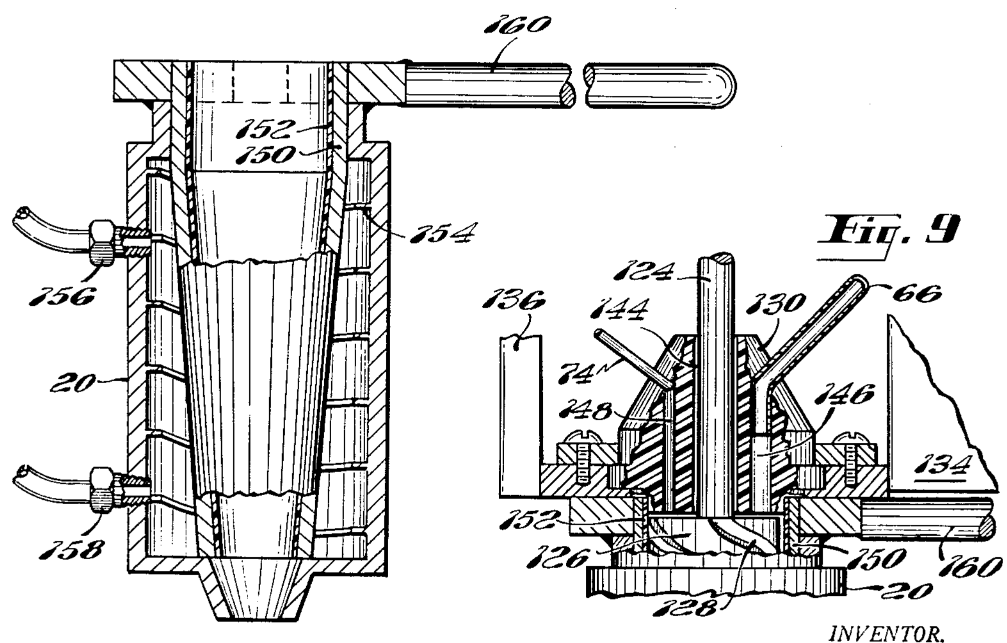
INVENTOR.
Ralph Stedman Hood
BY
Porter, Chittick & Russell
Attys.

United States Patent Office 2,974,830

Patented Mar. 14, 1961

2,974,830

MIXING DEVICE

Ralph Stedman Hood, Marblehead, Mass., assignor to Davidson Rubber Company, Charlestown, Mass., a corporation of Massachusetts Filed Dec. 17, 1958, Ser. No. 781,067

16 Claims. (Cl. 222—135)

This invention relates to a device for measuring, feeding, mixing and intermittently dispensing predetermined quantities of liquids, and more particularly to a device which is adapted to automatically and accurately perform the above functions as a means of filling receptacles passing by on an assembly line.

Mixing devices in the past have suffered from two principal defects. The first of these is an inability to measure consistently accurate amounts of liquids which are to be mixed, and the second is a structural problem involving unwieldy concentrations of machinery at or near the output elements of the device. These defects are due, in part, to the fact that the liquids to be mixed are ordinarily reactive with each other. This precludes mixing before the dispensing operation. Accordingly, devices in ordinary use today have shut-off valves in their liquid supply lines directly adjacent to their mixing chambers. It is this concentration of equipment which leads to difficulties in design, construction, and maintenance. Since the shut-off valves are commonly used as metering valves also, an additional complication arises. The principle of operation of such metering devices is that of timed flow of liquid under constant pressure. The accuracy of such metering systems thus depends upon a number of factors which tend to vary over periods of time. The viscosity of the liquids being measured can change, the pressure of the individual liquids may change, or the pressure of all the liquids may change. Any one of these variables will adversely affect the accuracy of metering.

It is an object of my invention to provide a mixing device which can accurately measure and mix predetermined amounts of liquids and consistently perform these functions over extended periods of time without adjustment. It is another object to provide a mixing device which is uncomplicated in structure, and is easy to clean and maintain.

It is a further object of my invention to provide a mixing device in which the ratios of quantities of the liquids to be mixed can be easily varied over a continuous range by simple mechanical changes. In connection with this, it is another object to provide a mixing device in which there is a constant simultaneous flow of liquids into a mixing chamber with a simultaneous start and finish of the flow. Still another object is to provide simple means for adjustment of the timing of the various cycles of operation.

In the accomplishment of these and other objects of my invention in a preferred embodiment thereof, I employ a number of cylinders, one for each liquid to be mixed, each connected by suitable valves and tubing to its own reservoir and all connected to a mixing chamber. Within each cylinder is a piston, and all the pistons are operable simultaneously by a single lever arm. Air pressure is employed to force the liquids into their respective cylinders. When a predetermined volume has been pumped into the cylinders, electrical switches then turn the same air pressure to work in operating control valves and in moving the lever arm which in turn causes the pistons to displace the volume of liquid just pumped in and to force it into the mixing chamber. The diameters of the tubes leading into the mixing chambers are chosen according to the viscosity of the liquids which they hold, so that the liquid will remain at rest when no pressure is exerted behind it. Thus, liquids only flow into the mixing chamber when the pistons force them out of their respective cylinders. Valves can be placed at any point between the cylinders and the mixing chamber to prevent the pressure exerted while the cylinders are being filled from being transmitted to the mixing chamber.

It is a feature of my invention that the constant volume displacement of liquids is a much more accurate means of measurement than the timed flow of liquids under a pressure which must be kept constant. The accuracy of measuring in my invention is independent of changes of pressure or of viscosity of the liquids involved. It is another feature of my invention that the mixing chamber can be remote from all measuring functions, permitting a simple structure which can be removed easily for cleaning.

It is a further feature of my invention that the mixing ratios of the liquids can be easily adjusted by changing the relative positions of the cylinders on the lever arm which actuates the pistons. Since the travel of the lever arm varies as the distance from the fulcrum, the travel of the pistons attached to the lever arm can be made to vary by attaching them at different points to the arm. Another feature of my invention is that time required to eject the liquids from their cylinders and force them into the mixing chamber is independent of the amounts of liquids involved. The time required is always the time taken by the lever arm to complete its movement, because the same lever is attached to all the pistons which force the liquids out of their respective cylinders. It should be noted that an important feature of my invention is the simultaneous flow of the liquids. Since one lever operates all the pistons, it is obvious that the outward flow of liquids will begin simultaneously and end simultaneously. This also means that over any given time span within the flow, the proportions of the liquids measured are always the same. In conventional measuring systems, using timed flow measuring devices, the proportions are different at different times, with the result that mixing is apt to be uneven. It is a feature of my invention that mixing is done in the most efficient manner by providing unvarying proportions of liquids in the mixing chamber. Since all the power for the various operations of my device is taken from a common source of air pressure, it is still another feature of my invention that the time of each operation can be easily controlled by adjusting valves in the various air pressure lines.

These and other objects and features of the invention will best be understood and appreciated from the following description of a preferred embodiment thereof, selected for purposes of illustration, and shown in the accompanying drawings in which.

Figure 1:
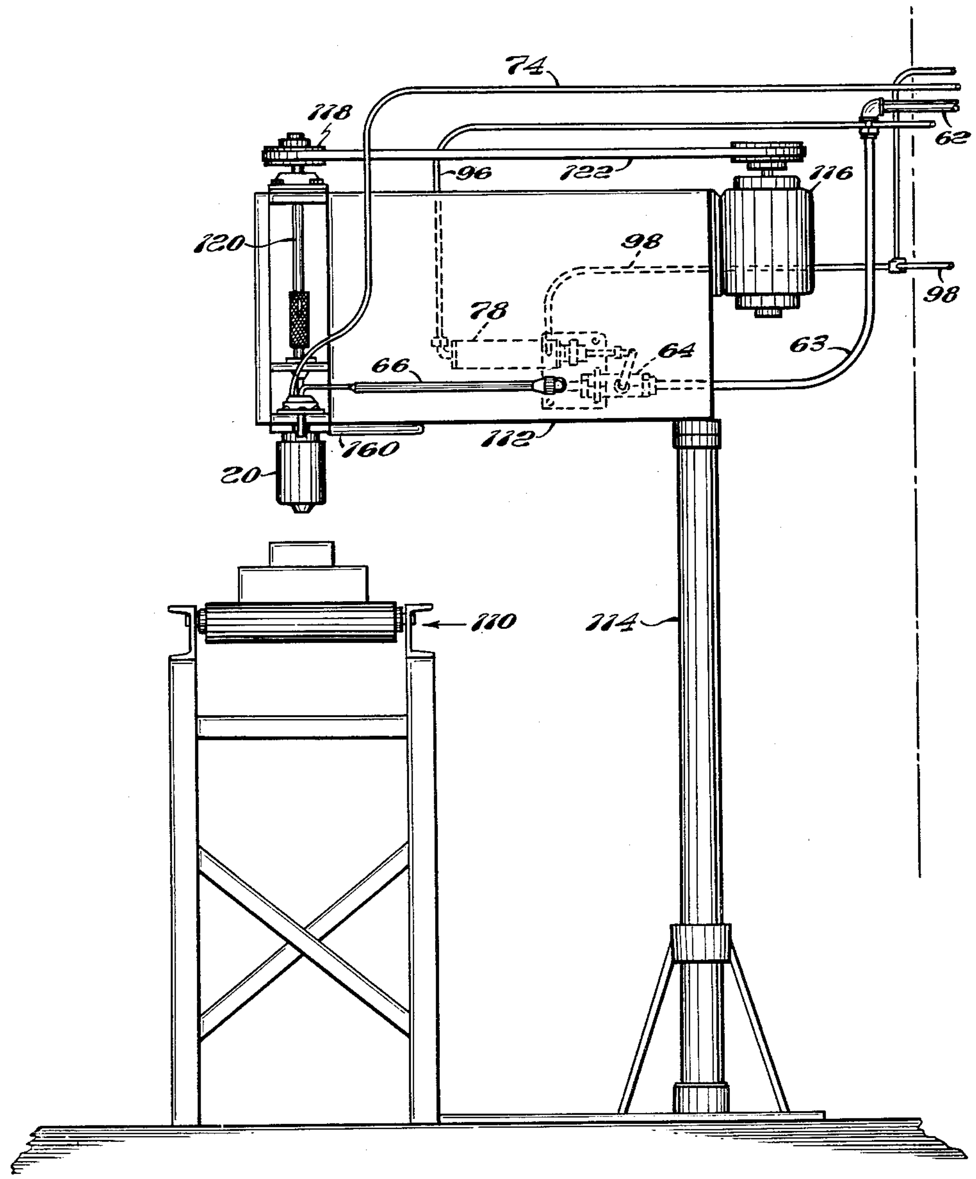
Fig. 1 is a view in side elevation of a portion of a mixing device devoted generally to mixing functions.
Figure 2:
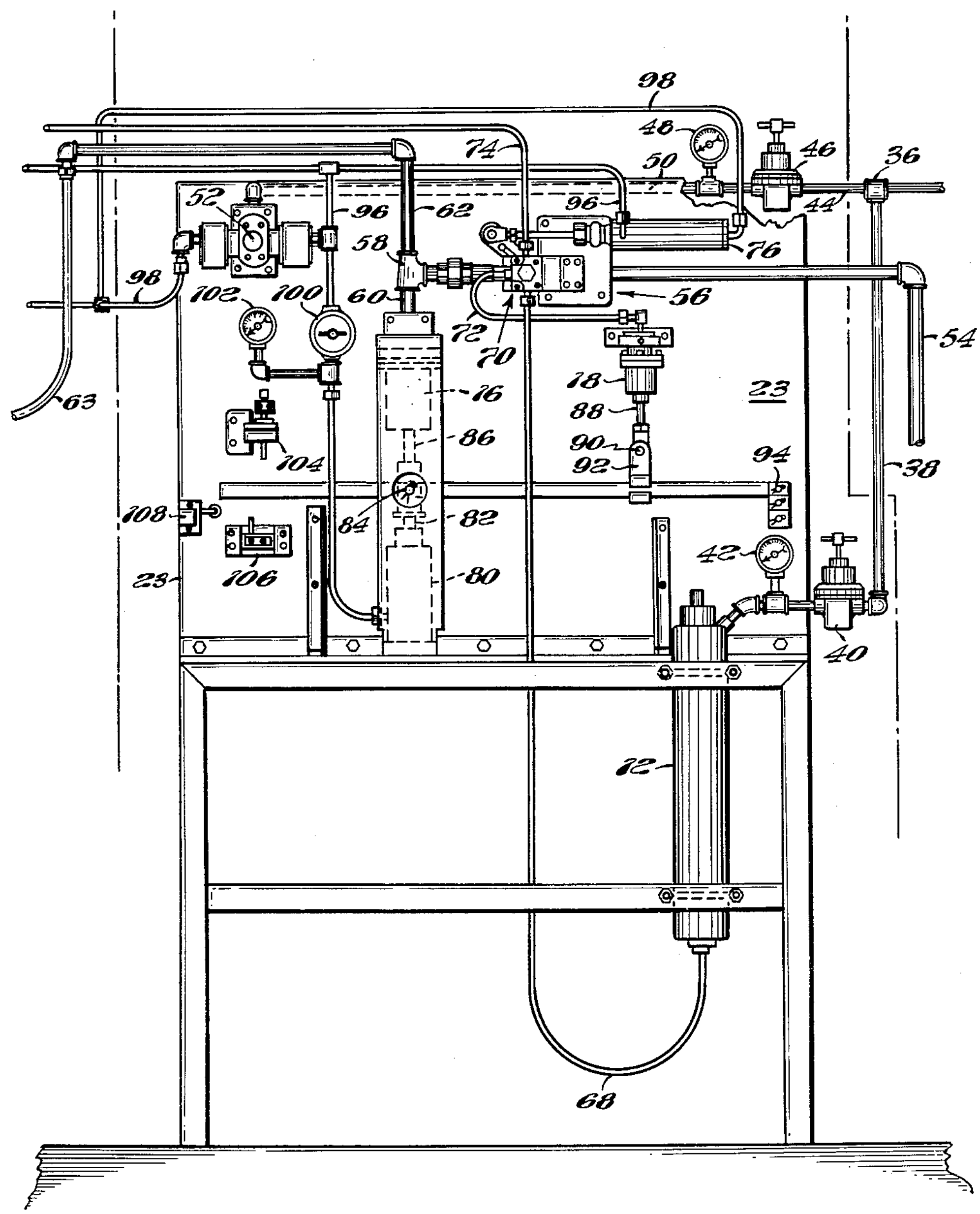
Fig. 2 is a view in side elevation of a portion of a mixing device devoted generally to measuring functions.
Figure 3:
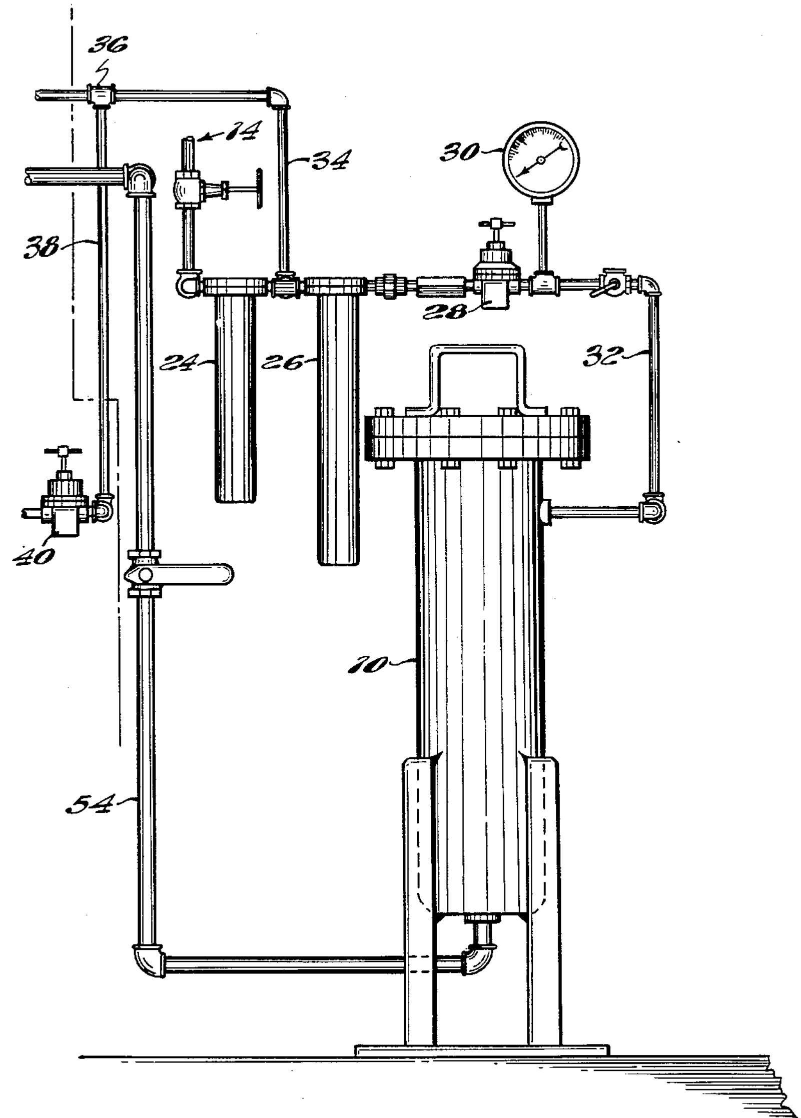
Fig. 3 is a view in side elevation of a portion of a mixing device devoted generally to reservoir functions.
Figure 4:
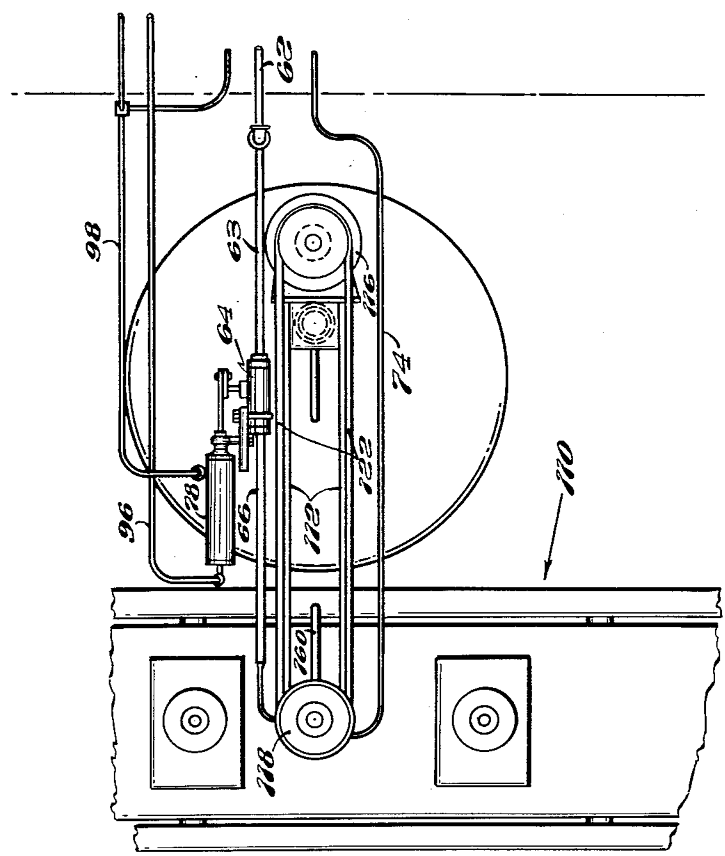
Figure 10:
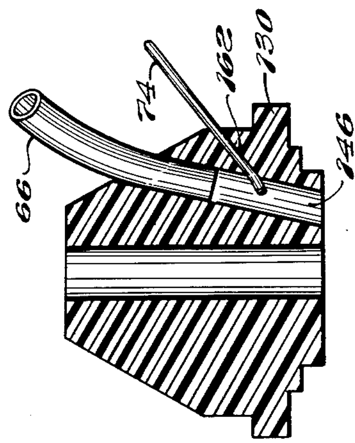
Figure 5:
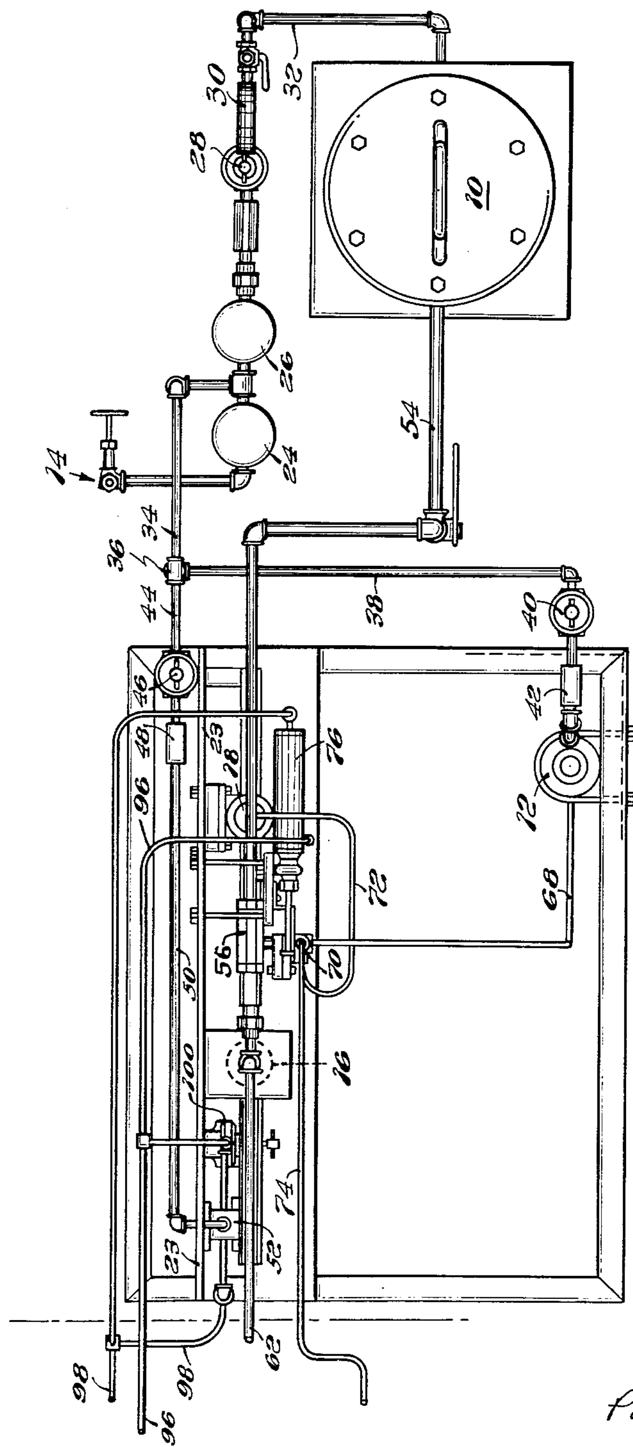

Figs. 1–3, in composite, with Fig. 1 at the left, Fig. 2 in the center and Fig. 3 at the right, are a view in side elevation of the entire device;

Fig. 4 is a plan view of a portion of a mixing device devoted generally to mixing functions;

Fig. 5 is a plan view of portions of a mixing device devoted generally to measuring and reservoir functions;

Figs. 4 and 5, in composite, with Fig. 4 at the left and Fig. 5 at the right, are a plan view of the entire device;

Fig. 6 is a view in side elevation of a mixing head;

Fig. 7 is a plan view of a mixing chamber;

Fig. 8 is a vertical sectional view of a mixing chamber;

Fig. 9 is a view in side elevation, partially broken away for purposes of clarity, of a mixing chamber with a mixing head and mixing chamber bushing in place; and Fig. 10 is a vertical sectional view of an alternative type of mixing chamber bushing.

In a preferred embodiment of my invention, which is best seen in a composite of Figs. 1–3, I employ a structure capable of measuring, mixing and dispensing two liquids. This particular embodiment is suited for use with any two liquids which must be kept separate before use. For example, the device can be used with urethane resin and a catalyst which combine to form urethane foam. The device shown in Figs. 1–3 is also designed to dispense predetermined amounts of a mixture intermittently into containers passing by on a conveyor.

For the sake of convenience in describing the preferred embodiment, the two liquids to be mixed will be referred to as resin and catalyst, and the components associated with them as resin components and catalyst components respectively. It should be understood, however, that the scope of my invention is not limited to mixing these particular substances, nor is it limited to mixing only two substances in number. Furthermore, the fluid pressure to be used will be referred to as air pressure, although this also should not be construed as a limitation.

In Figs. 1–3, the primary elements of a preferred embodiment include a resin reservoir 10, a catalyst reservoir 12, a main air pressure input at 14, a resin cylinder 16, a catalyst cylinder 18, a mixing chamber 20 and a lever arm 22. The cylinders 16 and 18, and the lever arm 22 are mounted on a base element 23, which is shown as a metal plate in Fig. 2. From the main air pressure input at 14, air flows through a first desiccant tank 24 and then branches off into two flow paths, with one branch going through a second desiccant tank 26, through a pressure control valve 28, past a pressure gauge 30, and through a pressure line 32 into the top of the resin reservoir 10. A second branch after the first desiccant tank 24 flows through a pressure line 34, is divided again at a junction 36, flows through a pressure line 38, through a pressure control valve 40, past a pressure gauge 42 and into the top of the catalyst reservoir 12. From the junction 36, another branch flows through a pressure line 44, through a pressure control valve 46, past a pressure gauge 48 through a pressure line 50 and into a three-way air pressure control valve 52. The three-way control valve 52 controls the flow of air pressure into various control cylinders, which in turn control the flow of resin and catalyst.

In the resin flow path, a resin line 54 conducts resin under pressure from the resin reservoir 10 through an input resin control valve indicated at 56 and into a three-way junction 58. A short resin line 60 leads into resin cylinder 16. A resin line 62 leads from the three-way junction 58 into a flexible resin line 63, which in turn is connected to an output resin control valve 64. From the valve 64, a resin line 66 leads into the mixing chamber 20.

In the catalyst flow path, a catalyst line 68 conducts catalyst under pressure from the catalyst reservoir 12 into a three-way catalyst control valve indicated at 70. A catalyst line 72 leads from the valve 70 to the catalyst cylinder 18, and a catalyst line 74 leads from the valve 70 to the mixing chamber 20. Note that the three-way catalyst control valve 70 is mounted adjacent to the input resin control valve 56, and note also that the three-way catalyst control valve 70 acts as both an input and an output valve, performing the same functions with respect to the catalyst which the separate resin valves 56 and 64 perform with respect to the resin. The valves 56 and 70 are mounted adjacent to each other so that both can be operated by a single air pressure control cylinder 76. Another air pressure control cylinder 78 operates the output resin control valve 64.

An air pressure cylinder 80 is mounted on the base element 23 in a position to drive the lever arm 22 upwards. A piston arm 82 extends upwards from the cylinder 80 and is pivotally connected at 84 to the lever arm 22. A piston arm 86 extends downwards from the resin cylinder 16 and is also pivotally connected at 84 to the lever arm 22. A piston arm 88 extends downwards from catalyst cylinder 18 and is pivotally connected at 90 to a clamping member 92 which is slidably fastened to the lever arm 22. The fulcrum of the lever arm 22 is a pivotal connection at 94 to the base element 23.

The piston arms 86 and 88 are connected to devices known as "Bellofram" within their respective cylinders 16 and 18. The "Bellofram" are diaphragms with the cylinders 16 and 18 which divide each cylinder into two sections with a tight seal between them and which are sufficiently flexible to be moved back and forth in the cylinders 16 and 18 in the same way as a piston. If conventional pistons were used, they would quickly become jammed due to the nature of the resin and catalyst in the cylinders 16 and 18 which would leak past any conventional piston sealing devices. By sealing the cylinder off into two sections with a very flexible diaphragm, made of a non-reactive material, the resin or catalyst can be confined to one portion of the cylinder, and no jamming or clogging problems occur.

Connecting the air pressure three-way control valve 52 with the air pressure control cylinders 76 and 78 and the air pressure cylinder 80 are a number of air pressure lines, as follows: an air pressure line 96 connects one side of the valve 52 with one side of the cylinders 76 and 78; an air pressure line 98 connects the other side of the valve 52 with the other side of the cylinders 76 and 78 and also leads to an air pressure control valve 100, to an air pressure gauge 102 and to the air pressure cylinder 80.

Two electrical switches 104 and 106 are adjustably mounted on the base element 23 in positions where they will be actuated by the movement of the lever arm 22. These switches 104 and 106 are electrically connected to the three-way air pressure control valve 52, as will be explained further. A third switch 108 is adjustably mounted on the base element 23, is also actuated by the movement of the lever arm 22, and is electrically connected to a conveyor line indicated at 110 (in Fig. 1).

The mixing chamber 20 is fastened to a pair of parallel panels 112 which are supported by a post 114. As can be seen in Fig. 1, the panels 112 support a number of other components, including the output resin control valve 64, an air pressure control cylinder 78, a variable speed electric motor 116, a pulley 118, and a shaft 120 connecting the pulley and a rotating element within the mixing chamber 20. A belt 122 connects the motor 116 and the pulley 118.

The construction details of the panels 112 and the mixing chamber 20 are shown more clearly in Figs. 6–9. Fig. 6 shows a mixing head designated generally at 123 consisting of a shaft 124, a body portion 126, and spiral ridges 128 around the body portion 126. In Figs. 7 and 9, a catalyst line 74 and a resin line 66 lead into a bushing 130, which rests upon a mounting plate 132. The mounting plate 132 is attached at one side to the panels 112 and to a U-shaped element 134 which holds the panels 112 apart in parallel spaced relationship. Another U-shaped element 136 is attached to the opposite side of the plate 132. A mounting ring 138, secured by bolts 140, holds the bushing in place on the plate 132. The mixing chamber 20 is secured to the mounting plate 132 by any suitable fastening means, such as hooks 142 indicated in shadow form in Fig. 7.

In the bushing 130, a passageway 144 extends through the center and holds the mixing head shaft 124. The resin line 66 extends into a passageway 146, and the catalyst line 74 extends into a passageway 148. The three passageways 144, 146, and 148 open into the interior of the mixing chamber 20.

In the mixing chamber 20, an inner shell 150 is lined with a thin layer 152 of material, such as Teflon, chosen so as to be non-reactive with the substances to be mixed. The mixing head body 126 and the ridges 128 are coated with the same material, although this is not shown in Fig. 6. The bushing 130 is also composed of this material, or some other suitable non-reactive susbtance. Between the inner shell 150 and the outer shell of the mixing chamber 20 are spiral baffles 154 to circulate water for cooling which is pumped in through a nozzle 156, and conducted out through a second nozzle 158. The water for cooling is necessary to prevent the energy of the mixing process from heating the resin and catalyst to a point where their reaction would take place too quickly. A handle 160 is attached to the mixing chamber 20 for convenience in holding the chamber 20 for cleaning.

Fig. 10 shows an alternative form of bushing 130, in which the passageway 162, corresponding to passageway 148 in Fig. 9, does not extend into the interior of the mixing chamber, but instead terminates at a point in the wall of passageway 146. The catalyst line 74 is pushed through the entire length of the passageway 162 and extends out into the center of passageway 146. The advantages of this construction will become apparent from the discussion below.

In order to explain the operation of the mixing device, it will be assumed that the device is at the beginning of a cycle of measuring, feeding, mixing and dispensing. The lever arm 22 is in its uppermost position, having actuated switch 104. This switch 104 operates the three-way air pressure control valve 52 and sends air pressure out through pressure line 96 to operate the air pressure control cylinders 76 and 78. The result of this is to close output resin control valve 64, to open input resin control valve 56, and to adjust the three-way catalyst control valve 70 so that the path from catalyst line 68 to catalpst line 72 is open. At this stage the paths from resin reservoir 10 to resin cylinder 16, and from catalyst reservoir 12 to catalyst cylinder 18 are open. Air pressure which is at all times exerted from the main input at 14 now forces resin and catalyst from their respective reservoirs 10 and 12 to their cylinders 16 and 18.

The result of the filling of these cylinders 16 and 18 is to force downwards the pistons within them and to force down the piston arms 86 and 88, which in turn forces down the lever arm 22. The limit of downward motion of the lever arm 22 is the electrical switch 106. As soon as this switch 106 is actuated, it operates the three-way air pressure control valve 52 so that air pressure no longer flows through pressure lines 96 but is diverted to pressure lines 98. Air pressure flowing through lines 98 operates air pressure control cylinders 76 and 78 and air pressure cylinder 80. The result of this is to close input resin control valve 56, to open output resin control valve 64, to adjust the three-way catalyst control valve 70 so that the path from catalyst line 72 to catalyst line 74 is open, and to force the piston in cylinder 80, its piston arm 82, and the lever arm 22 upwards. Since the paths from the cylinders 16 and 18 to the mixing chamber 20 are open, and since the air pressure in cylinder 80 is forcing the lever arm 22 and thereby the pistons in cylinders 16 and 18 upwards, resin and catalyst flow through lines 66 and 74 into the mixing chamber 20. The electric motor 116 is at all times revolving the mixing head 123 within the chamber 20, and the resin and catalyst are thus mixed and dispensed from the bottom of mixing chamber 20. The third electrical switch 108 is situated so that the lever arm 22 trips it in its downward motion, and thereby the conveyor line 110 is set in motion so that a receptacle receives the mixture of resin and catalyst from the mixing chamber 20.

As soon as the lever arm 22 is forced upwards far enough to actuate switch 104, the entire cycle is repeated, since air pressure is cut off from pressure lines 98 and diverted to pressure lines 96.

While the process of filling the cylinders 16 and 18 from the reservoirs 10 and 12 goes on, it is important to note the state of the resin and catalyst remaining at rest in resin line 66 and catalyst line 74. There is no pressure on either line during the cylinder-filling stage since resin valve 64 is closed and catalyst valve 70 is closed as to line 74. If the resin and catalyst remaining in lines 66 and 74 were free to drip down out of their respective passageways 146 and 148 in the bushing 130 into the mixing chamber 20, considerable problems might arise as to sticking in the mixing chamber 20, since there would be enough resin and catalyst to mix and react but not enough to be forced out by the mixing head 123. However, resin and catalyst are precluded from dripping by the fact that the passageways 146 and 148 are sufficiently narrow so that the viscosity of the resin or catalyst does not permit any flow when no pressure is exerted. Thus, the bushing need not be encumbered with shut-off valves, since the effect of a complete checking of flow at the bushing is achieved by other means.

The reason for the placement of the resin valve 64 somewhat nearer the mixing chamber 20 than its counterpart in the catalyst line, valve 70, is that the flexible resin line 63 is subject to a certain amount of dilation by the surge of pressure when resin is driven from the cylinder 16. The elasticity of the line 63 tends to bring it back to its original shape after the pressure from the cylinder 16 is taken off, and this could result in an undesirable continuation of pressure in the resin line 66, which in turn would cause some dripping of resin into the mixing chamber 20. However, the presence of resin valve 64 prevents any pressure exerted by the contraction of resin line 63 from reaching resin line 66.

The alternative form of bushing 130 shown in Fig. 10 has the advantage of providing an extra measure of mixing of resin and catalyst before the two liquids enter the mixing chamber 20. The passageway 146 and the catalyst line 74 are again made sufficiently small to check the flow of their respective liquids, and the only possible source of trouble would appear to be at the end of catalyst line 74, which extends into passageway 146. Due to the nature of urethane resin and its catalyst, the interface existing between them at this point does not cause a premature reaction, and no sticking problems occur. This is explained by the fact that thorough mixing of urethane resin and its catalyst are required before a foaming reaction will take place. A small interface such as that between the resin in passageway 146 and the catalyst in line 74 is not a sufficient mixing.

Variations in the desired quantities of resin and catalyst to be mixed are easily made. Since the travel of the lever arm 22 determines the travel of the pistons within cylinders 16 and 18, and thereby the volume of resin and catalyst taken in and forced out in each cycle, changing the extent of travel of the lever arm 22 will change the quantities of resin and catalyst measured and fed to the mixing chamber 20. The travel of the lever arm 22 is limited by the switches 104 and 106, and either of these can be adjusted upwards or downwards on the base element 23. When it is desired to change the ratio of resin to catalyst measured, the position of cylinder 18 can be varied horizontally on the base element 23 and the clamping member 92 is then moved correspondingly on the lever arm 22. The catalyst line 72 is composed of some suitable flexible material so that it need not be worked on when the cylinder 18 is moved.

It should be noted that variations in quantities or ratios of resin and catalyst have no effect on the manner in which they are fed to the mixing chamber 20 by the upswing of the lever arm 22. The start and finish of the flow of both materials is always simultaneous, assuring the best possible mixing results.

Other variations in the operation of the device are available by means of adjusting the air pressure in the various lines. Thus, air pressure control valves 28 and 40 are adjustable to vary the pressure exerted on the resin and catalyst in their reservoirs 10 and 12. This directly affects the rate at which the fluids will fill their their respective cylinders 16 and 18. The pressure control valve 100 determines the amount of pressure exerted in the air pressure cylinder 80 and thereby determines the rate at which the resin and catalyst will be forced from their cylinders 16 and 18 into the mixing chamber 20. By adjusting these pressure controls 28, 40 and 100, a wide range of timing is available for each cycle. For example, a rapid feeding to the mixing chamber 20 and a rapid mixing and dispensing can be combined with a slow refilling of the cylinders 16 and 18, by passing high pressure through valve 100 and low pressure through valves 28 and 40.

Certain minor variations of this preferred embodiment will be apparent to those skilled in the art; and, therefore, it is not my intention to confine the invention to the precise form herein shown, but rather to limit it in terms of the appended claims.

Having thus described and disclosed a preferred embodiment of my invention, what I claim as new and desire to secure by Letters Patent of the United States is:

1. A device for measuring, feeding, mixing and intermittently dispensing predetermined quantities of a plurality of liquids comprising; a base element; a plurality of cylinders, one for each liquid to be mixed; a like plurality of pistons movable within said cylinders; means pivotally connected to said base element and operatively connected to said pistons for moving said pistons simultaneously a predetermined distance with said cylinders, said means including a lever arm and said pistons being adjustably connected to said lever arm; a plurality of reservoirs containing said liquids, one for each of said liquids; a plurality of first connecting means for said liquids, one connecting each said reservoir with one said cylinder; a mixing chamber; a plurality of second connecting means for said liquids, one connecting each said cylinder with said mixing chamber; and valve means operatively associated with said cylinders for causing flow of said liquid only into said cylinders from said reservoirs when motion of said pistons creates a pressure in said cylinders lower than the pressure in said reservoirs and only into said mixing chamber when motion of said pistons into said cylinders creates a pressure in said cylinders greater than the pressure in said mixing chamber.

2. A device for measuring, feeding, mixing and intermittently dispensing predetermined quantities of a plurality of liquids comprising a base element; a plurality of cylinders adjustably fixed to said base element, one cylinder for each liquid to be mixed; a like plurality of pistons movable within said cylinders; means pivotally connected to said base element for moving said pistons simultaneously a predetermined distance within said cylinders; a plurality of reservoirs containing said liquids, one for each of said liquids; a plurality of first connecting means for said liquids, one connecting each said reservoir with each said cylinder; a mixing chamber; a plurality of second connecting means for said liquids, one connecting each said cylinder with said mixing chamber; a fluid pressure supply; first pressure connecting means connecting said fluid pressure supply with said reservoirs; and second pressure connecting means connecting said fluid pressure supply with said means for moving said pistons.

3. The device defined by claim 2 further characterized by a first pressure adjustment valve contained within said first pressure connecting means; and a second pressure adjustment valve contained within said second pressure connecting means.

4. A device for measuring, feeding, mixing and intermittently dispensing predetermined quantities of a plurality of liquids comprising a base element; a plurality of cylinders adjustably fixed to said base element, one cylinder for each liquid to be mixed; a like plurality of pistons movable within said cylinders; a like plurality of piston rods pivotally connected to said pistons; a lever element; a pivotal connection between said lever and said base element forming a fulcrum of said lever; adjustable pivotal connections between each of said piston rods and said lever, one for each of said piston rods; means operable by fluid pressure for moving said lever; a plurality of reservoirs containing said liquids, one for each of said liquids; a plurality of first connecting means for said liquids, one connecting each said reservoir with each said cylinder; a mixing chamber; a plurality of second connecting means for said liquids, one connecting each said cylinder with said mixing chamber; a fluid pressure supply; first pressure connecting means connecting said fluid pressure supply with said reservoirs; and second pressure connecting means connecting said fluid pressure supply with said means for moving said lever.

5. The device defined by claim 4 further characterized by a first pressure adjustment valve contained within said first pressure connecting means; and a second pressure adjustment valve contained within said second pressure connecting means.

6. The device defined by claim 4 further characterized by first control valves, one contained within each said first connecting means for said liquids; and second control valves, one contained within each said second connecting means for said liquids.

7. The device defined by claim 6 further characterized by said second control valves being substantially remote from said mixing chamber; and a bushing covering said mixing chamber, said bushing having passageways contained therein, one passageway leading from each said second connecting means for said liquids to the interior of said mixing chamber.

8. The device defined by claim 7 further characterized by said bushing having a plurality of passageways contained therein, one for each of said liquids, a first said passageway leading from a second connecting means for one of said liquids to the interior of said mixing chamber, and the other said passageways leading from the other second connecting means for said liquids to the interior center of said first passageway.

9. The device defined by claim 8 further characterized by said bushing consisting of a material impervious to and non-reactive with said liquids to be mixed, and each said passageway being sufficiently narrow to allow the viscosity of a liquid in said passageway to check its flow through said passageway when no pressure is exerted on said liquid.

10. A device for measuring, feeding, mixing and intermittently dispensing predetermined quantities of a plurality of liquids comprising a base element; a plurality of cylinders adjustably fixed to said base element, one cylinder for each liquid to be mixed; a like plurality of pistons movable within said cylinders; a like plurality of piston rods pivotally connected to said pistons; a lever element; a pivotal connection between said lever and said base element forming a fulcrum of said lever; adjustable pivotal connections between each of said piston rods and said lever, one for each of said piston rods; means operable by fluid pressure for moving said lever; a plurality of reservoirs containing said liquids, one for each of said liquids; a plurality of first connecting means for said liquids, one connecting each said reservoir with each said cylinder; first control valves, one contained within each said first connecting means for said liquids; a mixing chamber; a plurality of second connecting means for said liquids, one connecting each said cylinder with said mixing chamber; second control valves, one contained within each said second connecting means for said liquids; a fluid pressure supply; first pressure connecting means, one means connecting said fluid pressure supply with each said reservoir; a three-way fluid pressure valve; a second pressure connecting means connecting said fluid pressure supply with said three-way valve; first control cylinders, one for operating each said first control valve; second control cylinders, one for operating each said second control valve; a third pressure connecting means connecting said three-way valve with said means for moving said lever; a fourth pressure connecting means connecting said three-way valve with said first and second control cylinders; and a fifth pressure connecting means connecting said three-way valve with said first and second control cylinders.

11. The device defined by claim 10 further characterized by first pressure adjustment valves contained within said first pressure connecting means, one valve within each said means; a second pressure adjustment valve contained within said second pressure connecting means; and a third pressure adjustment valve contained within said third pressure connecting means.

12. The device defined by claim 11 further characterized by electrical switches mounted upon said base element, said switches operatively connected to said three-way fluid pressure valve, and said switches actuated by the motion of said lever element.

13. A device for measuring, feeding, mixing and intermittently dispensing predetermined quantities of a plurality of liquids comprising a base element; a plurality of cylinders adjustably fixed to said base element, one cylinder for each liquid to be mixed; a like plurality of pistons movable within said cylinders; a like plurality of piston rods pivotally connected to said pistons; a lever element; a pivotal connection between said lever and said base element forming a fulcrum of said lever; adjustable pivotal connections between each of said piston rods and said lever, one for each of said piston rods; means operable by fluid pressure for moving said lever; a plurality of reservoirs containing said liquids, one for each of said liquids; a plurality of first connecting means for said liquids, one connecting each said reservoir with each said cylinder; first control valves, one contained within each said first connecting means for said liquids; a mixing chamber; a plurality of second connecting means for said liquids, one connecting each said cylinder with said mixing chamber; second control valves, one contained within each said second connecting means for said liquids; a fluid pressure supply; first pressure connecting means, one means connecting said fluid pressure supply with each said reservoir; first pressure adjustment valves contained within said first pressure connecting means, one valve within each said means; a three-way fluid pressure valve; a second pressure connecting means connecting said fluid pressure supply with said three-way valve; a second pressure adjustment valve contained within said second pressure connecting means; first control cylinders, one for operating each said first control valve; second control cylinders, one for operating each said second control valve; a third pressure connecting means connecting said three-way valve with said means for moving said lever; a third pressure adjustment valve contained within said third pressure connecting means; a fourth pressure connecting means connecting said three-way valve with said first and second control cylinders; a fifth pressure connecting means connecting said three-way valve with said first and second control cylinders; electrical switches adjustably mounted upon said base element, said switches operatively connected to said three-way fluid pressure valve, and said switches activated by the motion of said lever element.

14. The device defined by claim 13 further characterized by said second control valves being substantially remote from said mixing chamber; and a bushing covering said mixing chamber, said bushing having passageways contained therein, one passageway leading from each said second connecting means for said liquids to the interior of said mixing chamber.

15. The device defined by claim 14 further characterized by said bushing having a plurality of passageways contained therein, one for each of said liquids, a first said passageway leading from a second connecting means for one of said liquids to the interior of said mixing chamber, and the other said passageways leading from the other second connecting means for said liquids to the interior center of said first passageway.

16. The device defined by claim 15 further characterized by said bushing consisting of a material impervious to and non-reactive with said liquids to be mixed, and each said passageway being sufficiently narrow to allow the viscosity of a liquid in said passageway to check its flow through said passageway when no pressure is exerted on said liquid.

References Cited in the file of this patent

UNITED STATES PATENTS

| | | |
|---|---|---|
| 1,964,028 | Boynton et al. | June 26, 1934 |
| 2,788,953 | Schneider | Apr. 16, 1957 |